(12) United States Patent
Kuwahara et al.

(10) Patent No.: US 7,751,381 B2
(45) Date of Patent: Jul. 6, 2010

(54) WIRELESS BASE STATION USING WEIGHTING ELEMENTS OF AN ARRAY ANTENNA

(75) Inventors: Mikio Kuwahara, Hachioji (JP); Kenzaburo Fujishima, Kokubunji (JP); Masanori Taira, Yokohama (JP); Koji Meguro, Yokohama (JP); Toru Okamoto, Yokohama (JP)

(73) Assignees: Hitachi, Ltd. (JP); Hitachi Communication Technologies, Ltd. (JP); Hitachi Advanced Systems Corporation (JP)

( * ) Notice: Subject to any disclaimer, the term of this patent is extended or adjusted under 35 U.S.C. 154(b) by 882 days.

(21) Appl. No.: 11/065,364

(22) Filed: Feb. 25, 2005

(65) Prior Publication Data

US 2006/0002287 A1    Jan. 5, 2006

(30) Foreign Application Priority Data

Jun. 30, 2004    (JP)    ............... 2004-193330

(51) Int. Cl.
   *H04B 7/216*    (2006.01)
(52) U.S. Cl. .................................. 370/342
(58) Field of Classification Search ............. 370/238.1, 370/338, 342, 346, 347, 395.1, 441, 442, 370/913
   See application file for complete search history.

(56) References Cited

U.S. PATENT DOCUMENTS

| 6,763,062 | B1 | 7/2004 | Kohno et al. |
| 7,042,860 | B2 * | 5/2006 | Kasami et al. ............. 370/334 |
| 7,218,621 | B2 * | 5/2007 | Lee ........................... 370/335 |
| 2002/0021684 | A1 | 2/2002 | Toshimitsu et al. |
| 2004/0001554 | A1 | 1/2004 | Sun et al. |

FOREIGN PATENT DOCUMENTS

| JP | 2000-332666 | 11/2000 |
| JP | 2001-128230 | 5/2001 |
| JP | 2001-309424 | 11/2001 |
| JP | 2001-320761 | 11/2001 |
| JP | 2002-077012 | 3/2002 |
| JP | 2003-110485 | 4/2003 |
| JP | 2003-110486 | 4/2003 |
| JP | 2003-304577 | 10/2003 |
| WO | WO 03/077491 | 9/2003 |

OTHER PUBLICATIONS

Office Action in Japanese Appln .Ser. No. 2004-193330, dated Jun. 30, 2009 (in Japanese), (3 pages).

* cited by examiner

*Primary Examiner*—Chirag G Shah
*Assistant Examiner*—Khuong Tran
(74) *Attorney, Agent, or Firm*—Antonelli, Terry, Stout & Kraus, LLP.

(57) ABSTRACT

To provide a wireless base station comprising an array antenna which transmits packets to terminals, a packet scheduler which determines transmission sequence of the packets, a modulator which generates modulated signals based on the packets, and a beam former for transmission signal which multiplies the packets with array weights for transmission signal and outputs the transmission signal to the array antenna the beam former for transmission signal comprises a memory which stores the array weights for transmission signal associated with the terminals' IDs. The beam former for transmission signal receives the IDs of selected terminals from the packet scheduler, refers to the memory, and selects the array weights for transmission signal by the IDs of the terminals.

8 Claims, 7 Drawing Sheets

| ID | 1 | 2 | ... | n |
|---|---|---|---|---|
| $W_{Tx}$ | | | ... | |

TERMINALS TRANSMITTED PACKETS

| TERMINALS TO BE STEERED NULL | ID | 1 | 2 | ... | n |
|---|---|---|---|---|---|
| | 1 | $W_{NULL}$ | | | |
| | 2 | | | | |
| | ... | | | | |
| | n | | | | | though for the first related art technique described above is not completed at 600 times a second when there are many terminals concurrently communicating. Because the antenna pattern calculation by the base station consumes time, second terminal candidates cannot be determined in a short time.

WIRELESS BASE STATION USING WEIGHTING ELEMENTS OF AN ARRAY ANTENNA

CLAIM OF PRIORITY

The present application claims priority from Japanese application P2004-193330 filed on Jun. 30, 2004, the content of which is hereby incorporated by reference into this application.

BACKGROUND OF THE INVENTION

This invention relates to a wireless base station with an array antenna and, more particularly, to such a base station that executes weighting the elements of the array antenna at a high speed.

Spatial domain multiplexing (SDM) is a technique by which a base station transmits signals to multiple terminals concurrently at a same frequency. In the space domain multiplexing, three prior art techniques are known as methods of scheduling without decreasing throughputs.

A first related art technique is a scheduling method described in Ohfuji et al. "Examining a Scheduling Method for Transmitting Multi-Directional Beams for Downlink High-Speed Packet Transmission" presented on Sep. 13, 2002 at the 2002 IEICE (the Institute of Electronics, Information and Communication Engineers) Society Conference B-5-88.

The base station predicts channel throughputs, using channel state information received from terminals, and sets a terminal having the greatest throughput as a first terminal. The base station calculates an antenna pattern for the first terminal.

Then, the base station selects any other terminal and calculates an antenna pattern for that terminal. The base station sets a terminal for which the array gain in the direction of the selected terminal in the antenna pattern for the first terminal is under threshold and the array gain in the direction of the first terminal in the antenna pattern for the selected terminal is under threshold as a second terminal candidate. The base station repeats this operation for all terminals and determines second terminal candidates.

The base station predicts channel throughputs from the channel state information from the terminals taken as the second terminal candidates and sets a terminal with the greatest predicted throughput as a second terminal. The technique in which the base station schedules transmissions at the same frequency to a plurality of terminals in this way is known.

A second related art technique is a scheduling method described in JP 2003-110485A.

The base station divides terminals with which it communicates into groups. The groups are set up so that the terminals in a group are less interfering with each other. The base station calculates the sum of channel throughputs for the terminals per group and schedules transmissions to the terminals in the group having the greatest sum of the channel throughputs. Such scheduling technique is known.

A third related art technique is a scheduling method described in JP 2003-110486A.

The base station sets a terminal having the greatest channel throughput as a first terminal, as in the first related art technique described above. The base station sets a terminal whose estimated bearing is more than a given angle from the first station as a second terminal. Such scheduling technique is known.

SUMMARY OF THE INVENTION

In an FDD system (e.g., cdma2000 1xEV-DO system), a base station receives channel state information from terminals at a frequency of 600 times a second. Thus, because the base station performs scheduling at this frequency, there is little time before transmitting packets after the scheduling. The above related art techniques did not provide for a weighting method in which the base station determines array weights for transmission signal at a high speed. Consequently, it would take to long if the base station performed weighting after the scheduling.

The base station executes calculation to determine an antenna pattern for scheduling. However, because the amount of the calculation to determine an antenna pattern is considerably large, the base station is unable to determine terminals to which it can transmit packets concurrently in a short time.

An object of this invention is that the base station determines array weights for transmission signal in a short time. Another object of this invention is that the base station determines terminals to which it can transmit packets concurrently in a short time by decreasing the amount of calculation for scheduling.

This embodiment of this invention provides a wireless base station comprising an array antenna which transmits packets to terminals, a packet scheduler which determines transmission sequence of the packets, a modulator which generates modulated signals based on the packets, and a beam former for transmission signal which multiplies the packets with array weights for transmission signal and outputs them to the array antenna. In the wireless base station which transmits the packets to a plurality of terminals, the beam former for transmission signal includes a memory to store the array weights for transmission signal associated with the terminals' IDs. The beam former for transmission signal receives the IDs of selected terminals from the packet scheduler, looks in the memory, and selects the array weights for transmission signal by the IDs of the terminals.

According to this invention, the base station can determine the array weights for transmission signal in a short time.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Embodiments of this invention will be described hereinafter with reference to the drawings.

First Embodiment

First, a first embodiment where the base station does not apply null steering is discussed. The null steering mentioned herein means placing nulls in a direction; thereby, the base station removes signals in the direction from a particular terminal or does not transmit radio waves in that direction to reduce interference to communication with other terminals.

Figure 1:
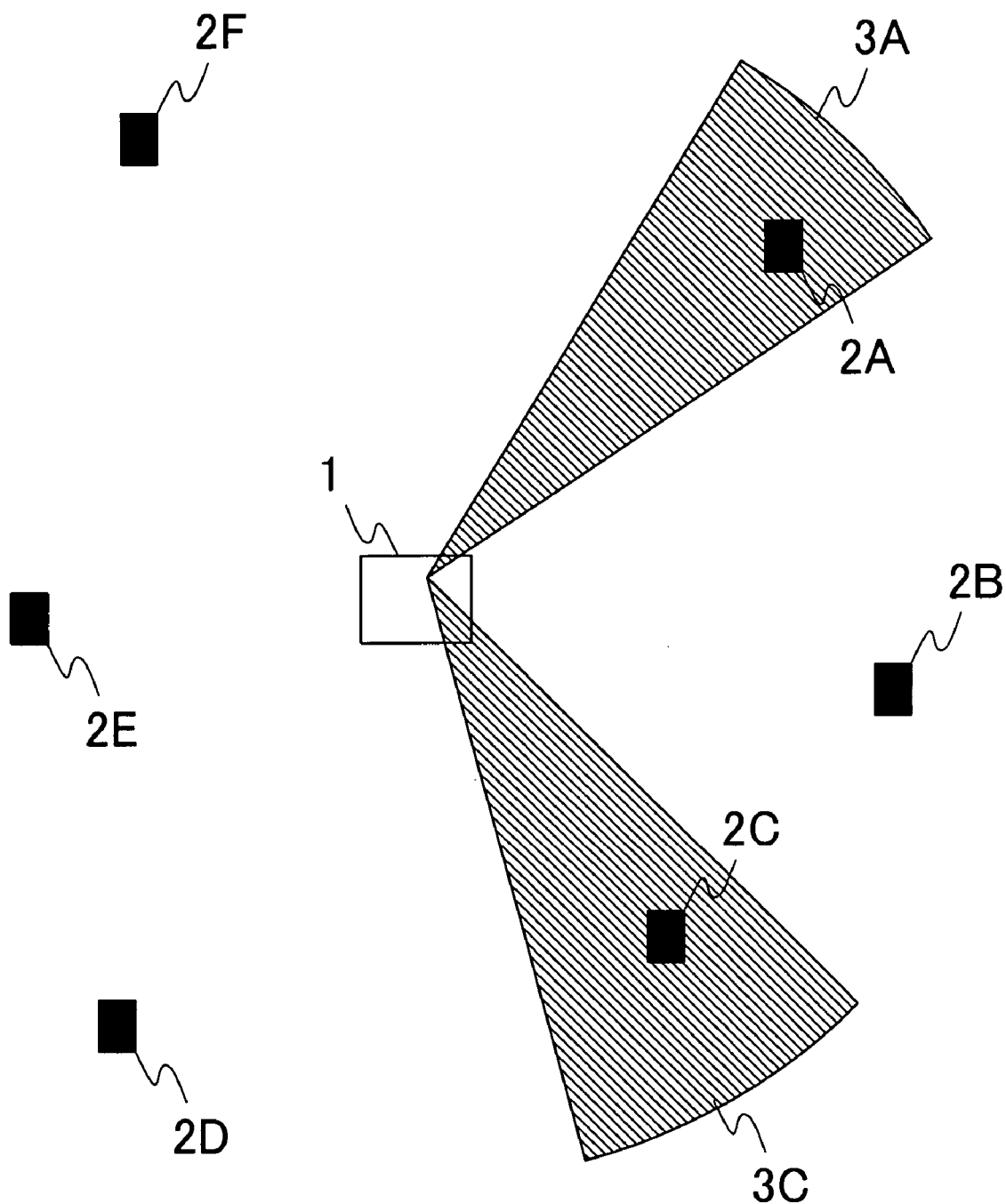
FIG. 1 is a topology diagram of a wireless communication system according to a first embodiment of this invention.

FIG. 1 shows a system topology of a base station and terminals communicating with the base station, according to the first embodiment of this invention.

A wireless communication system of the first embodiment comprises a base station 1 and terminals 2A, 2B, 2C, 2D, 2E, and 2F. All terminals 2 are within an area where they can communicate with the base station 1.

The base station transmits pilot signals at predetermined time intervals throughout its coverage area. Each terminal 2 receives a pilot signal and estimates the state of its downlink channel (from the base station to the terminal) from the received pilot signal. Each terminal 2 transmits the result of the channel state estimation (channel state information) to the base station 1. The frequency of this transmission varies depending on the applied wireless communication scheme; for example 600 times per second for cdma2000 1xEV-DO and 500 times per second for W-CDMA HSDPA.

In the FDD system, uplink (from a terminal to the base station) and downlink transmissions use different frequencies. Consequently, the base station 1 cannot estimate a downlink channel state from a received uplink signal. For this reason, each terminal 2 estimates the downlink channel state from the pilot signal from the base station 1 and transmits the channel state information to the base station 1.

The base station 1 performs scheduling to determine terminals 2 to which should transmit packets from the received channel state information. Specifically, the base station 1 compares the channel state parameters received from all terminals 2. And then, the base station 1 schedules transmission to a terminal with the best channel state preferentially. Moreover, during a time zone when the channel state for a terminal 2 becomes bad, the base station 1 schedules transmission to another terminal 2 with a better channel state. In this way, the scheduling helps minimize fading effects and increase frequency use efficiency.

The base station 1 transmits a packet to a terminal 2 in accordance with the scheduling. The base station 1 transmits the packet, playing an antenna beam 3 toward the terminal 2. By orienting antenna beams 3, the base station 1 is able to transmit packets to multiple terminals 2 concurrently at the same frequency. This technique of transmitting packets to multiple terminals 2 concurrently at the same frequency is called spatial domain multiplexing (SDM).

At this time, as will be described later, according to a predetermined value indicating an allowable level to which the states of the channels may deteriorate by mutual interference to communication on the channels, the base station 1 determines whether such deterioration is not more than the predetermined value. If so, the base station 1 transmits packets to terminals 2A and 2C, as described with FIG. 1, concurrently at the same frequency.

Figure 2:
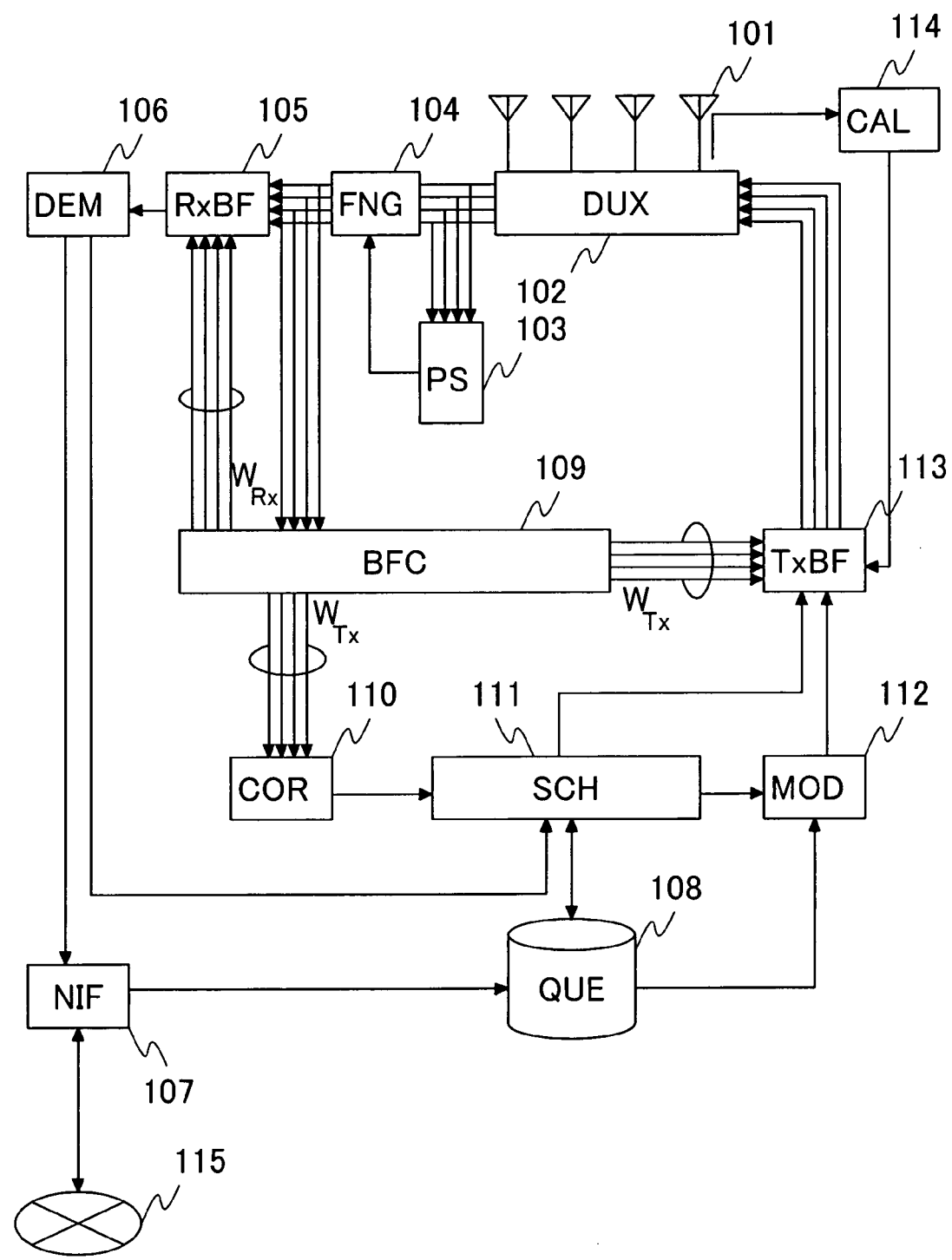
FIG. 2 is a bock diagram of a base station for the first embodiment of this invention.

FIG. 2 is a bock diagram of the base station 1 for the first embodiment of this invention, where the base station has the uplink based on CDMA and the downlink based on TDMA using shared channels. This base station will be described below.

First, the configuration of the base station 1 is described, according to uplink signal flow.

Antennas 101 receive or transmit signals from/to the terminals 2. A duplexer 102 transfers received signals to a path detector 103 and fingers and transmits transmission signals from the antennas 101 to the terminals 2.

The path detector 103 performs synchronization processing to detect a code phase through the use of a matched filter or a sliding correlator and inputs the detected code phase to the fingers. If using, for example, the matched filter, the path detector 103 calculates correlation between a received signal and a pilot signal having a particular code phase and determines whether the correlation is equal to or greater than a predetermined threshold against the sum of noise and an interference level. The path detector 103 detects a path in time with a code phase when that correlation is obtained and verifies synchronization established.

The path detector 103 has a function equivalent to a beam former for received signal 105 internally and performs the synchronization processing on received signals multiplied and weighted with predetermined array weights for received signal; thereby, it can enhance the sensitivity of path detection.

Using the code phase input from the path detector 103, the fingers 104 despread the signals from the terminals 2. The fingers 104 feed the despread signals to the beam former for received signal 105 and a beam forming control unit 109. In this relation, a spreading factor used when despreading the signals is denoted by G.

The beam forming control unit 109 obtains array weights for received signal $W_{RX}$ and array weights for transmission signal $W_{TX}$ from the despread signals.

First, the beam forming control unit 109 obtains the array weights for received signal $W_{RX}$ by a subspace method. The fingers 104 input signals ($r_K$ (N) or $r_L$ (N)) corresponding to the antennas and the path phases to the beam forming control unit 109. Then, the beam forming control unit 109 obtains correlation values from the input signals and obtains a correlation matrix from the correlation values.

$$R = GR_{SS} + R_{NN} = \begin{bmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{bmatrix} \quad \text{[Equation 1]}$$

where $$r_{KL} = \sum_n r_K(n) r_L^*(n)$$

$r_K$ (N) presents despread signals of signals received by K antennas at time n.

$$r_{KL} = r_{LK}^*$$

Considering a particular path phase, the beam forming control unit 109, takes the inputs of as many signals as the number of antennas and, therefore, the correlation matrix (R in equation 1) comprises as many rows and columns as the number of antennas. Because this correlation matrix (R in equation 1) is obtained from the despread signals, a desired signal subspace ($R_{SS}$ in equation 1) is a dominant term and the signal subspace can be extracted by a relatively small number of additions.

However, the signals involve an interference subspace $R_{NN}$ as well and it is needed to remove the interference subspace. For this reason, the outputs R' of the fingers 104 from which path phase G was removed on purpose are obtained, using equation 2.

$$R' = R_{NN} + R_{SS} \quad \text{[Equation 2]}$$

To remove the interference subspace $R_{NN}$, then, calculation is executed by equation 3.

$$R_{SS} = \frac{R - R'}{G - 1} \quad \text{[Equation 3]}$$

By executing eigen value decomposition of the desired signal subspace $R_{SS}$ thus obtained, the array weights for received signal $W_{RX}$ are obtained as in equation 4. Here, max{eig(X)} denotes calculation to obtain an eigen vector with a maximum eigen value.

$$W_{RX} = \max_{\lambda} \{eig(R_{SS})\} \quad \text{[Equation 4]}$$

While the array weights for received signal $W_{RX}$ are obtained by the subspace method in this embodiment, they may be obtained by MMSE/LMS, MMSE/RLS, etc. for adaptive control.

Next, the beam forming control unit 109 obtains the array weights for transmission signal $W_{TX}$. This embodiment is based on the FDD system and uplink and downlink transmissions use different frequencies. Accordingly, the array weights for received signal $W_{RX}$ and the array weights for transmission signal $W_{TX}$ differ.

However difference between the uplink and downlink transmission frequencies is within a few percent and antenna intervals are no more than a half wavelength, difference between the array weights for received signal $W_{RX}$ and the array weights for transmission signal $W_{TX}$ is small. Therefore, the array weights for received signal $W_{RX}$ can be used as the array weights for transmission signal $W_{TX}$.

The array weights for transmission signal $W_{TX}$ may be generated by using another known method.

For example, the base station may be equipped with two antenna arrays for transmission and reception, both of which are equivalent in electrical length, and a technique of assigning equal values to the array weights for received signal $W_{RX}$ and the array weights for transmission signal $W_{TX}$ may be applied.

Alternatively, the array weights for transmission signal $W_{TX}$ may be obtained by giving an offset that is calculated from the difference between the uplink and downlink transmission frequencies to the array weights for received signal $W_{RX}$.

The beam forming control unit 109 inputs the array weights for received signal $W_{RX}$ to the beam former for received signal 105 and the array weights for transmission signal $W_{TX}$ to a beam former for transmission signal 113 and a correlator 110.

The beam former for received signal 105 form receive beams by multiplying the despread signals with the array weights for received signal $W_{RX}$, thus weighting the signals.

Then, the beam former for received signal 105 combines the beams per path (RAKE combining) and transfers a combined signal to a demodulator 106.

The demodulator deinterleaves the combined signal and demodulates channel coded data or the like into user data. The demodulator 106 sends the demodulated signal to a network 115 via a network interface 107. Then, uplink communication processing is complete.

Next, the configuration of the base station 1 is described, according to downlink signal flow.

A queue for transmission data 108 stores user data received from the network 115 via the network interface 107. The queue for transmission data 108 notifies, to a packet scheduler 111, ID of a terminal which stores user data, when the user data is stored into it. User data stored in the queue for transmission data 108 is fed to a modulator 112, according to scheduling of the packet scheduler 111.

The demodulator 106 inputs channel state information or a data transfer rate to the packet scheduler 111. Specifically, in the case of, for example cdma2000 1xEV-DO, each terminal 2 observes a pilot signal transmitted from the base station 1 and transmits the result of the channel state estimated from the pilot signal (channel state information) or the data transfer rate on the channel to the base station 1. When having demodulated the signal from the terminal, from the demodulated signal, the demodulator 106 extracts the channel state information or data transfer rate from the demodulated signal and inputs it to the packet scheduler 111.

The correlator 110 calculates correlations between the array weights for transmission signal $W_{TX}$ (array correlations) and inputs the calculated array correlations to the packet scheduler 111.

From all information input thereto, the packet scheduler 111 performs packet scheduling, according to a method which will be described later. When the packet scheduler 111 determines terminals 2 to which to transmit packets, it directs the queue for transmission data 108 to feed the user data addressed to the determined terminals 2 to the modulator 112. Then, the packet scheduler 111 notifies the modulator 112 of the applied modulation scheme and spreading factor. A modulation scheme, for example turbo coding can be used.

The modulator 112 modulates the user data by the notified modulation scheme and inputs the modulated data to the beam former for transmission signal 113. Although only a single modulator 112 is shown in FIG. 2, it should be noted that as many modulators as the maximum number of terminals to which the base station will transmit signals concurrently are installed in practical application.

The beam former for transmission signal 113, which has a configuration as will be described later, forms transmit beams by multiplying input signals with the array weights for transmission signal $W_{TX}$, thus weighting the signals. However, the beam former for transmission signal 113 must compensate difference in electrical length due to difference in cable length or the like to the respective antennas to weight the signals properly.

The transmit beams are supplied via the duplexer 102 to the antennas 101 and transmitted as radio waves to the terminals 2.

A calibration means 114 monitors the signals at the ends of the antennas 101 and checks to see whether the signals with a phase and amplitude as expected are being transmitted. Unless the signals as expected are transmitted, the calibration means 114 notifies the beam former for transmission signal 113 that expected signals failed to be transmitted.

Having received this notification, the beam former for transmission signal 113 adjusts the amplitude and phase rotation angle by modifying the array weights for transmission signal $W_{TX}$.

Figures 3A, 3B:
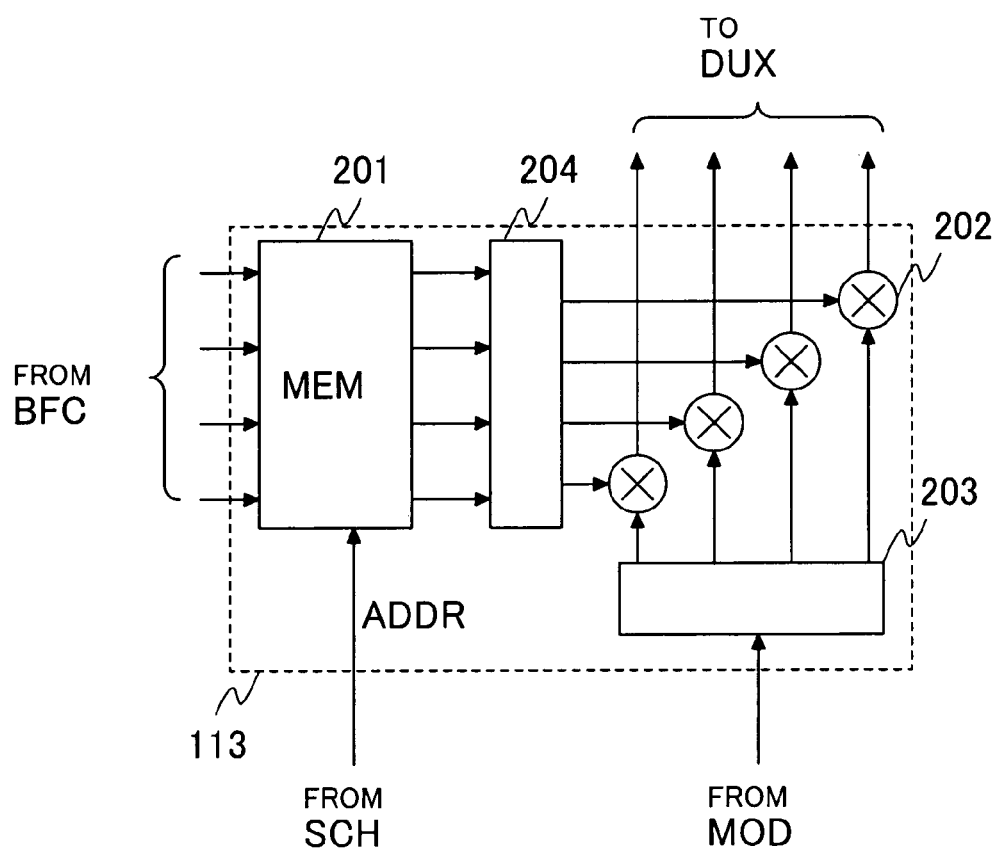
FIG. 3A is a bock diagram of a beam former for transmission signal for the first embodiment of this invention.
FIG. 3B illustrates a table stored on memory of the beam former.

FIG. 3A is a block diagram of the beam former for transmission signal 113 for the first embodiment of this invention, where the base station does not apply null steering.

The beam former for transmission signal 113 comprises a memory 201, a latch circuit 204, a divider 203, and multipliers 202.

The memory 201 stores a table containing the array weights for transmission signal $W_{TX}$ associated with the IDs of the terminals 2, as illustrated in FIG. 3B. The beam forming control unit 109 updates the array weights for transmission signal $W_{TX}$ at relatively long intervals on the order of 0.1 to 0.5 seconds.

The memory 201 receives the IDs of terminals to which the base station will transmit packets from the packet scheduler 111. The memory 201 looks in the table, retrieves the array weights for transmission signal $W_{TX}$ for the received IDs, and inputs the array weights to the latch circuit 204.

The latch circuit 204 holds the input array weights for transmission signal $W_{TX}$ until packet transmissions to the terminals 2 finish and inputs the array weights for transmission signal $W_{TX}$ to the multipliers 202 at timing to transmit packets.

The divider 203 divides a signal input from the modulator 112 into signals as many as the number of antennas and inputs the divided signals to the multipliers 202. The multipliers 202 multiply the divided signals with the array weights for transmission signal $W_{TX}$, thus weighting the signals, and form the beams.

Although algorithm techniques for the packet scheduler 111 exist heretofore, there have been no techniques for determining the array weights and weighting transmit signals at a high speed by the beam former for transmission signal 113.

The beam former for transmission signal 113 for this embodiment receives the IDs of the terminals 2 to which the base station will transmit packets, looks up the IDs in the table, simply selects the array weights for transmission signal $W_{TX}$ for the IDs, calculated beforehand, and weights the transmit signals; thus, it is possible to update the array weights for transmission signal $W_{TX}$ at a high speed.

Figure 4:
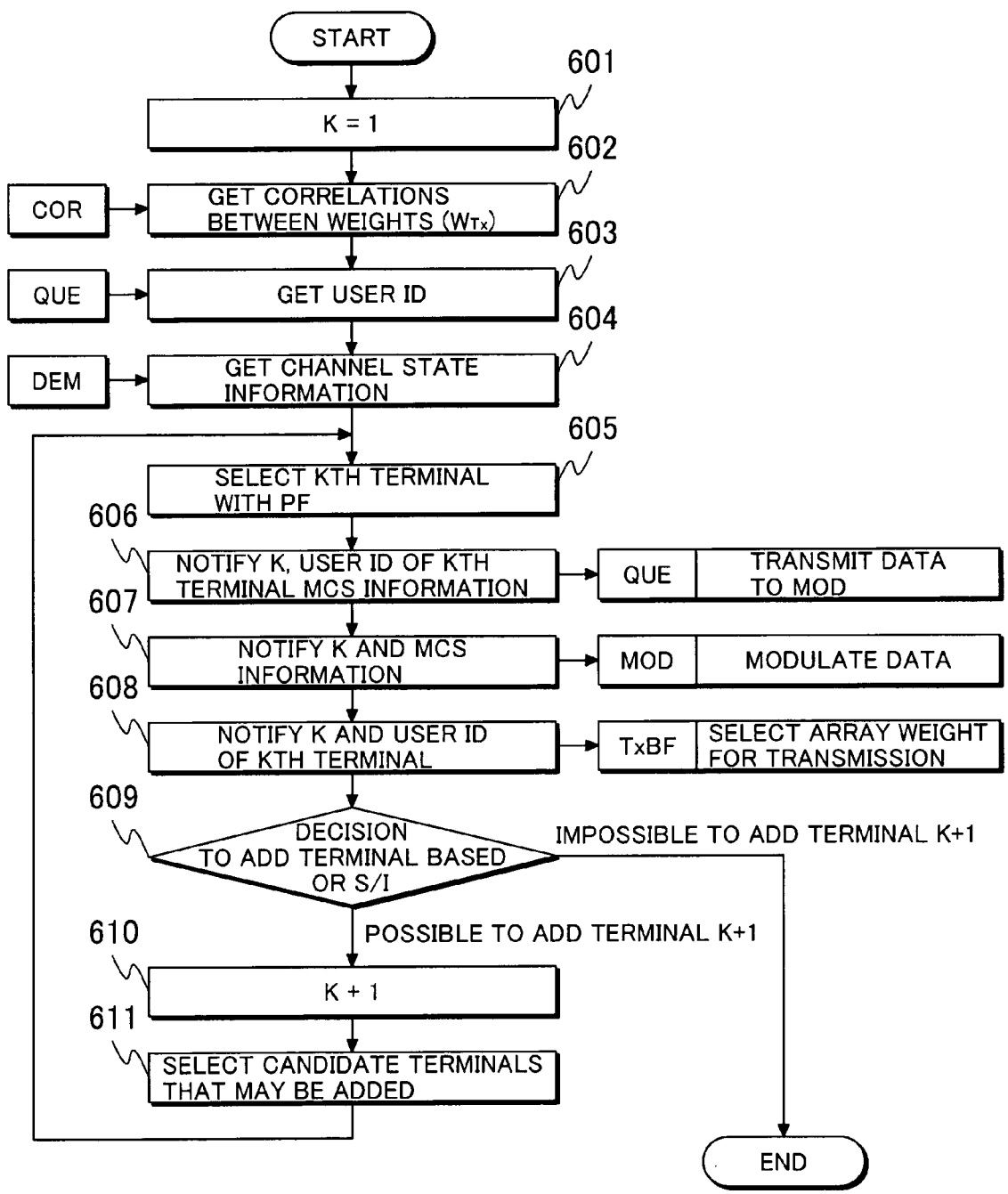
FIG. 4 is a flowchart of operation of the packet scheduler 111 for the first embodiment of this invention.

FIG. 4 is a flowchart of operation of the packet scheduler 111 for the first embodiment of this invention.

First, the packet scheduler 111 initializes the number of terminals K to communicate with the base station 1 to 1 (601). The packet scheduler 111 gets correlations between the array weights for transmission signal $W_{TX}$ (correlations between the array weights ρ) from the correlator 110 (602).

Then, the packet scheduler 111 gets the IDs of the terminals, the destinations of user data stored from the queue for transmission data 108 (603). Here, the terminal IDs should be uniquely recognized by at least the entities on the base station 1.

The packet scheduler gets channel state information from the demodulator 106 (604).

The packet scheduler 111 determines the K-th terminal, using proportional fairness (605). The proportional fairness is a calculation method for calculating evaluation functions of the terminals, transmissions to which are to be scheduled, and selecting a terminal with a highest evaluation function value.

Specifically, the packet scheduler 111 calculates the evaluation function for each terminal as in equation 5.

$$\Phi = DRC/R_{ave}$$ [Equation 5]

DRC is a data transfer rate based on the channel state information received from the terminal. $R_{ave}$ is an average data transfer rate for the terminal for which the evaluation function is calculated by averaging its statistical rates with a forgetting factor. Averaging with the forgetting factor is adding past rates recorded, multiplied with the forgetting factor less than 1, and averaging. This is the same operation as an IIR filter. This evaluation function evaluates whether the current data transfer rate for the terminal is higher or lower than the past average data transfer rate averaged with the forgetting factor.

The packet scheduler 111 selects the terminal with the highest evaluation function value and, thereby, preferentially schedules transmission to the terminal whose channel state is better than the past average data transfer rate. By thus using the proportional fairness, the packet scheduler 111 can perform scheduling, while maintaining the fairness among the terminals.

After determining the K-th terminal, the packet scheduler 111 notifies the queue for transmission data 108 of the number of terminals K to communicate with the base station, the ID of the K-th terminal, and the applied modulation and coding scheme (MCS) and spreading factor (606).

Having received the notification, the queue for transmission data 108 determines the user data and its amount to be transmitted to the K-th terminal. The packet scheduler 111 notifies the modulator 112 of the MCS and the number of terminals K to communicate with the base station (607). Having received the notification, the modulator 112 determines the modulation scheme of the K-th modulator 112. By the determined modulation scheme, the K-th modulator 112 modulates the user data fed from the queue for transmission data 108 and transfers the modulated data to the beam former for transmission signal 113.

The packet scheduler 111 notifies the beam former for transmission signal 113 of the ID of the K-th terminal and the number of terminals K to communicate with the base station (608). Having received the notification, the beam former for transmission signal 113 selects the array weights for transmission signal $W_{TX}$ to weight the data received from the K-th modulator 112.

Then, the packet scheduler 111 calculates channel state (S/I) deterioration which will be induced by an increment of K by one. The packet scheduler 111 determines that the (K+1)th terminal can be added if the deterioration is not more than a threshold and determines that the (K+1)th terminal cannot be added if the deterioration is more than the threshold (609).

If another terminal cannot be added, the packet scheduler 111 terminates the processing at this slot. If another terminal can be added, it increments K by one (610).

The packet scheduler 111 selects possible additional terminal candidates, using the correlations between the array weights r, as will be described later (611). After selecting the candidates, the packet scheduler 111 returns to step 605 to determine the (K+1)th terminal.

Selecting possible additional terminal candidates in step 611 are performed by the method below.

When, for instance, the packet scheduler 111 selects second terminal candidates, if the correlations between the array weights $\rho_{12}$ and $\rho_{21}$ corresponding to the first terminal and a terminal are not more than a predetermined value, it selects that terminal as a second terminal candidate. Here, the correlations between the array weights $\rho_{XY}$ represent the effect of the communication between the base station 1 and the Y-th terminal on the array weights for transmission signal $W_{TX}$ for the X-th terminal.

After selecting the candidates, the packet scheduler 111 returns to step 605 and determines the second terminal with the greatest evaluation function value, calculated by the proportional fairness, from among the selected candidate terminates.

When selecting third terminal candidates, likewise, the packet scheduler 111 uses the correlations between the array weights ρ. Specifically, if the sum of the correlations between the array weights $\rho_{12}$ for the first terminal and those $\rho_{13}$ for a terminal and the sum of the correlations between the array weights $\rho_{21}$ for the second terminal and those $\rho_{23}$ for the terminal are not more than a predetermined value, the packet scheduler selects that terminal as a candidate. Then, the packet scheduler 111 returns to step 605 and determines the third terminal.

Likewise, the packet scheduler 111 selects K-th (where K=4, 5, . . . ) terminal candidates.

Here, the reason why the packet scheduler 111 can select additional terminal candidates, using the correlations between the array weights ρ, is described.

When the base station 1 starts to communicate with the second terminal, while communicating with the first terminal, the probability of interference to the communication with the first terminal increases. The communication between the base station 1 and the second terminal causes deterioration of the channel state for the first terminal, as expressed in equation 6.

$$\frac{S_1}{I_1+N} \to \frac{S_1}{I_1+N+\rho_{12}S_2} \qquad \text{[Equation 6]}$$

Hence, from equation 6, the degree of deterioration of the channel state for the first terminal is expressed by the left side of equation 7. In equation 7, a threshold δ is set; this means that, if the degree of deterioration of the channel state for the first terminal is under the threshold δ, the effect of the interference causes no problem. The threshold δ is a real number greater than 1.

$$\frac{I_1+N+\rho_{12}S_2}{I_1+N} < \delta \qquad \text{[Equation 7]}$$

By transformation of equation 7, the correlations between the array weights r12 are as expressed in equation 8.

$$\rho_{12} < (\delta - 1)\left(\frac{I_1+N}{S_2}\right) \qquad \text{[Equation 8]}$$

If a second terminal is selected, so that the correlations between the array weights $\rho_{12}$ will be under a predetermined value (the value obtained by the right side of equation 7), the deterioration of the channel state for the first terminal will be under the threshold δ.

Thus, because the packet scheduler 111 can judge channel state deterioration, using only the correlations between the array weights ρ, it can select additional terminal candidates with less effect of interference.

Conversely, the communication with the first terminal causes deterioration of the channel state for the second terminal. Deterioration of the channel state for the second terminal can be expressed in equation 9 similarly to equation 7.

$$\frac{I_2+N+\rho_{21}S_1}{I_2+N} < \delta \qquad \text{[Equation 9]}$$

By transformation of equation 9, the correlations between the array weights $\rho_{21}$ are as expressed in equation 10.

$$\rho_{21} < (\delta - 1)\left(\frac{I_2+N}{S_1}\right) \qquad \text{[Equation 10]}$$

If the packet scheduler 111 selects a terminal for which the correlations between the array weights ρ satisfy the constraints given by equations 8 and 10 as the second terminal, the degree of channel state deterioration by interference will be under the threshold δ, even if the base station communicates with two terminals concurrently at the same frequency.

By repeating the operation of selecting possible additional terminal candidates (611), the packet scheduler 111 can determine whether the (K+1)th terminal can be added (609) for all terminals.

If, for instance, the base station 1 transmits to all terminals with equal transmitting power, the packet scheduler 111 can determine whether another terminal can be added to the first terminal up to the n-th terminal.

$$\rho_{12} + \rho_{13} + \cdots + \rho_{1n} < (\delta - 1)\left(\frac{I_1+N}{S}\right) \qquad \text{[Equation 11]}$$

To determine whether another terminal can be added (609), the packet scheduler 111 determines whether the (K+1)th terminal exists, keeping the constraint given by equation 11 satisfied if added to the K-th terminal that has already been allocated, where K increments by 1. Moreover, the packet scheduler 111 can execute the step 611 of selecting candidates for the (K+1)th terminal as well by making this decision.

In this embodiment, the packet scheduler 111 selects possible additional candidates by using only the correlations between the array weights ρ. Thus, the amount of calculation for this embodiment is smaller than that required by conventional techniques for selecting possible additional candidates by obtaining the angle of direction of each terminal. In general, the angle of direction must be obtained by a MUSIC method or the like requiring a great amount of calculation.

Second Embodiment

Now, a second embodiment where the base station 1 applies null steering is discussed.

The base station configuration is the same as that shown in FIG. 2 and its explanation is not repeated.

First, considering uplink signal processing, the beam forming control unit 109 executes a different calculation to obtain the array weights for received signal $W_{RX}$.

For array weights for received signal $W_{NULL}$ including null steering, it is needed to accurately obtain an interference subspace $R_{NN}$ when removing the interference subspace $R_{NN}$ and equation 12 is calculated.

$$R_{NN} = \frac{GR' - R}{G - 1} \quad \text{[Equation 12]}$$

Using the thus obtained interference subspace $R_{NN}$, the array weights for received signal $W_{NULL}$ including null steering are obtained by equation 13.

$$W_{Null} = R_{NN}^{-1} W_{RX} \quad \text{[Equation 13]}$$

Then, considering downlink signal processing, the beam former for transmission signal 113 uses a different table stored on its memory and receives different IDs of terminals from the packet scheduler 111.

Figures 5A, 5B:
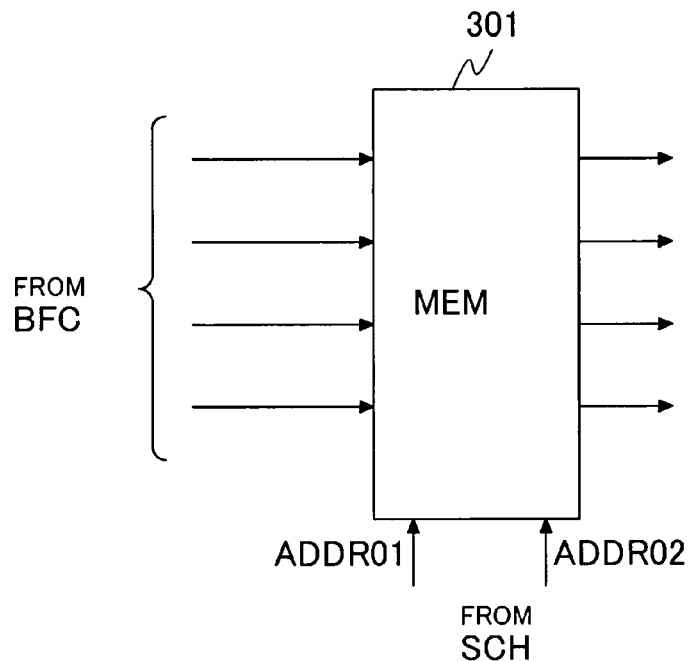
FIG. 5A is a block diagram of a memory of a beam former for transmission signal according to a second embodiment of this invention.
FIG. 5B illustrates a table stored on memory of the beam former.

FIG. 5A is a block diagram of the memory of the beam former for transmission signal 113 for the second embodiment of this invention, where the base station applies null steering. The memory 301 for this embodiment is installed instead of the memory 201 in FIG. 3.

In the case where the base station applies null steering, the memory 301 stores a table containing the array weights for transmission signal $W_{NULL}$ including null steering associated with the IDs of the terminals to which the base station may transmit packets and the IDs of the terminals onto which nulls are steered, as illustrated in FIG. 5B. Although nulls are steered onto a single terminal according to FIG. 5B, nulls can be steered onto any number of terminals by changing the table dimension.

The array weights for transmission signal $W_{NULL}$ including null steering are obtained by equation 14. Here, $R_{SS}$ is a signal subspace for a terminal onto which nulls are steered.

$$W_{Null} = R_{SS}^{-1} W_{TX} \quad \text{[Equation 14]}$$

From the packet scheduler 111, the memory 301 receives not only the IDs (ADDR01) of terminals to which the base station will transmit packets, but also the ID (ADDR02) of a terminal onto which nulls are steered Having received the IDs, the memory looks in the table and selects the array weights for transmission signal $W_{NULL}$ for these IDs.

Subsequent processing is the same as in the first embodiment and this invention can be carried out even in the case where the base station applies null steering.

Third Embodiment

A third embodiment where the base station applies an OFDMA communication scheme is discussed.

Figure 6:
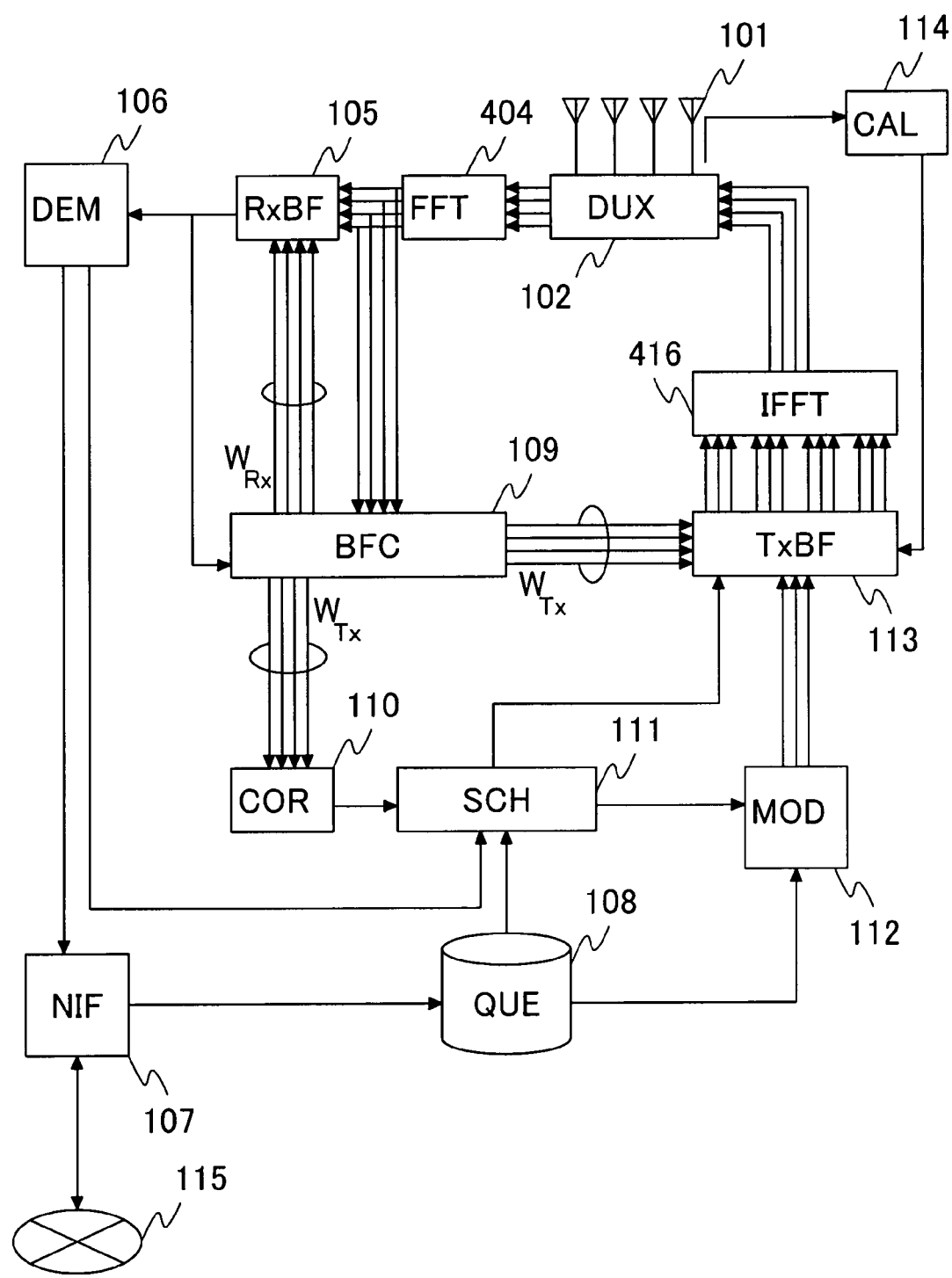
FIG. 6 is a block diagram of a base station according to a third embodiment of this invention.

FIG. 6 is a block diagram of a base station 1 according to the third embodiment of this invention, where the base station applies OFDMA.

Processing flows for the embodiment applying OFDMA are the same as described in the foregoing first and second embodiments and, therefore, different sections of the base station configuration are described. The components corresponding to those shown in FIG. 2 are assigned the same reference numbers and their explanation is not repeated.

In the base station configuration, a section for uplink signal processing differs from that for the first embodiment; that is, an FFT unit 404 is installed instead of the path detector 103 and the fingers 104.

The FFT unit 404 executes Fourier transform calculation, separates an input signal into sub-carrier signals, and inputs the sub-carrier signals to the beam former for received signal 105 and the beam forming control unit 109. The beam former for received signal 105 multiplies the input sub-carrier signals with the array weights for received signal $W_{RX}$, thus weighting the signals, and forms transmit beams. Other uplink signal processing that the base station 1 performs is the same as described for the first embodiment in conjunction with FIG. 2.

In the base station configuration, a section for downlink signal processing differs from that for the first embodiment; that is, an IFFT unit 416 is installed.

The modulator 112 modulates user data into multiple sub-carriers (e.g., three sub-carries in FIG. 6) and inputs the sub-carrier signals to the beam former for transmission signal 113. The beam former for transmission signal 113 multiplies all the sub-carrier signals with the array weights for transmission signal $W_{TX}$, thus weighting the signals, and feeds them to the IFFT unit.

The IFFT unit 416 executes inverse Fourier transform calculation on the weighted signals and converts the transmit beams into broadband signals. After passing through the duplexer 102, the broadband signals are transmitted from the antennas 101. Other downlink signal processing that the base station 1 performs is the same as described for the first embodiment in conjunction with FIG. 2.

In this way, this invention is also applicable to OFDMA.

Fourth Embodiment

A fourth embodiment where the base station applies multiple slot allocation is discussed.

Figure 7:
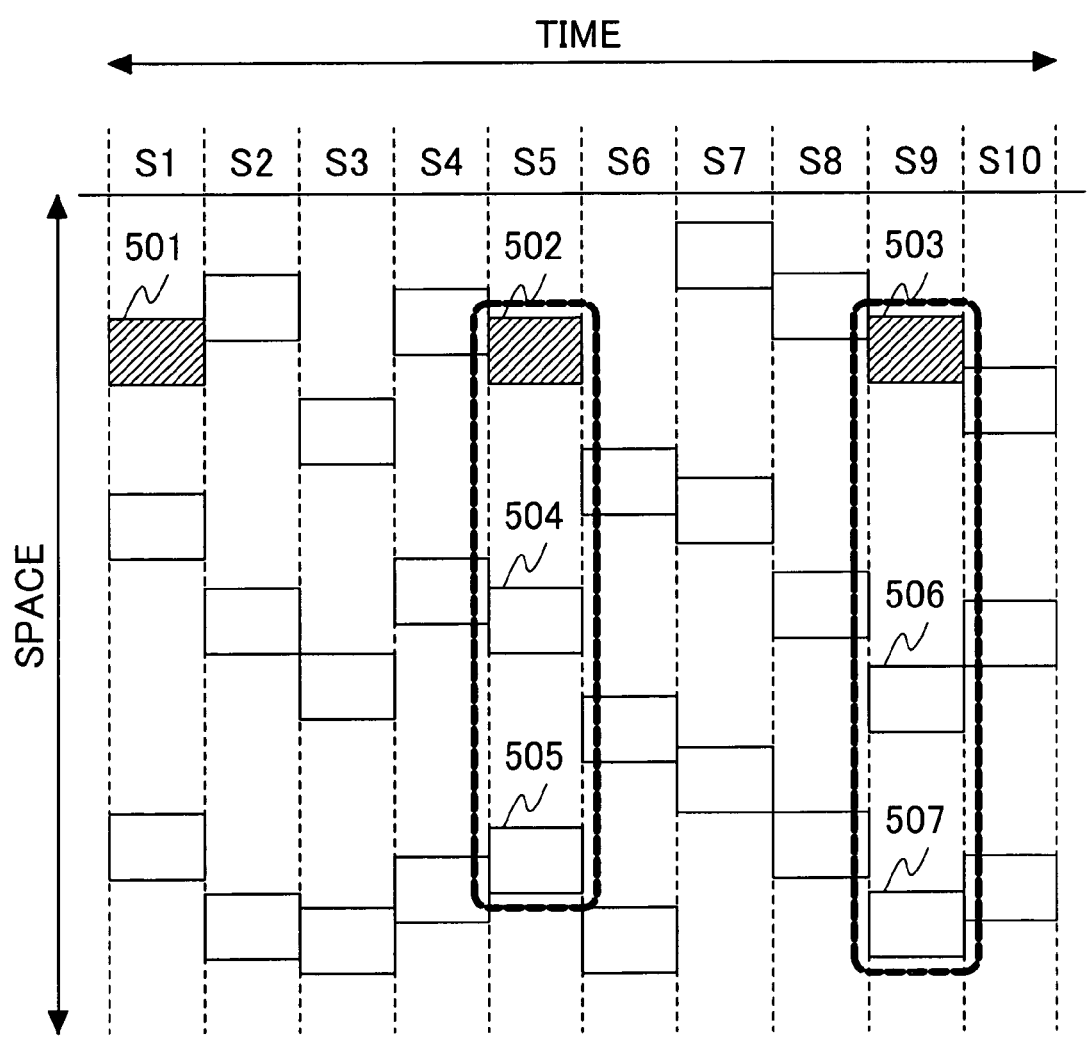
FIG. 7 shows a scheduling table for use in a fourth embodiment of this invention.

FIG. 7 shows a scheduling table with time (slots numbered) on the abscissa and space on the ordinate in the forth embodiment of this invention, where the base station applies multiple slot allocation.

The multiple slot allocation is a method of transmitting information with multiple slots at a decreased data transfer rate and effective when channel conditions are degraded because of transmission to a terminal far away from the base station or some other reason.

In the multiple slot allocation, when the base station 1 transmits a packet 501 in a slot S1 to a terminal, it is bound to transmit a packet 502 in a slot S5 and a packet 503 in a slot S9 to the same terminal.

In this case, the base station 1 is predetermined to transmit the packet 502 in the slot S5 before scheduling. Therefore, the packet scheduler 111 regards the first terminal as having been allocated and starts the operation with the step of determining whether a second terminal can be added (609). Subsequent steps are the same as in the scheduling method explained in conjunction with FIG. 4.

In this way, this invention is applicable even in the case where the base station applies the multiple slot allocation.

This invention can be applied to determining an array antenna pattern in a wireless communication system and is suitable for application to a system that determines an array antenna pattern, based on the signals transmitted from terminals or the like. While the embodiments based on FDMA and OFDMA have been discussed above, the invention can also be applied for other multiplexing schemes.

While the present invention has been described in detail and pictorially in the accompanying drawings, the present invention is not limited to such detail but covers various obvious modifications and equivalent arrangements, which fall within the purview of the appended claims.

What is claimed is:

1. A wireless base station for transmitting packets to a plurality of terminals, comprising:
   an array antenna which transmits packets to terminals;
   a packet scheduler which determines transmission sequence of the packets;

a modulator which generates modulated signals based on the packets;

a beam former for a transmission signal which multiplies the packets with array weights for the transmission signal and outputs the transmission signal to the array antenna, a correlator which calculates correlations between the array weights for the transmission signal; and a demodulator which demodulates a received signal from the terminal and extracts the states of downlink channels included in the demodulated signal which is estimated by the terminal, wherein, the beam former for the transmission signal comprises a memory which stores the array weights for transmission signal associated with the terminals' IDs, wherein the beam former for transmission signal receives the IDs of selected terminals from the packet scheduler, refers to the memory, and selects the array weights for transmission signal by the IDs of the terminals, and wherein the packet scheduler determines the transmission sequence of the packets, based on the correlations between the array weights and the states of the downlink channels.

2. The wireless base station according to claim 1, further comprising a beam forming control unit which updates the array weights for transmission signal stored in the memory at frequency lower than the frequency at which the beam former for transmission signal multiplies the packets with the array weights for transmission signal.

3. The wireless base station according to claim 1, further comprising a correlator which calculates correlations between the array weights for transmission signal, a receiver which receives control information from each terminal, and a channel estimator which estimates states of downlink channels from the control information, wherein the packet scheduler determines the transmission sequence of the packets, based on the correlations between the array weights and the states of channels.

4. The wireless base station according to claim 1, wherein the beam former for transmission signal selects the array weights for transmission signal by the ID of terminal to which the base station will transmit packets and the ID of terminal other than the terminals to which the base station will transmit packets.

5. The wireless base station according to claim 1, further comprising a combining and transforming unit which combines a plurality of sub-carrier signals and transforms them into signals to transmit from the array antenna, wherein the beam former for transmission signal multiplies each of the modulated sub-carriers generated by the modulator by the array weights for transmission signal and feeds them to the combining and transforming unit, and wherein the combining and transforming unit combines the signals and feeds the combined signals to the array antenna.

6. The wireless base station according to claim 1, wherein, if there is a terminal to which a channel has already been allocated for packet transmission thereto by multiple slot allocation, the packet scheduler determines whether to transmit packets to another terminal, based on the result of comparing estimated deterioration of the states of the channels with a predetermined value.

7. The wireless base station according to claim 1, wherein the downlink channels in which the base station transmits signals to the terminal and uplink channels in which the terminal transmits to the base station are on different frequencies.

8. The wireless base station according to claim 1, wherein a communication system including the base station and the terminal is a Frequency Division Duplex System.

* * * * *

UNITED STATES PATENT AND TRADEMARK OFFICE
CERTIFICATE OF CORRECTION

PATENT NO. : 7,751,381 B2
APPLICATION NO. : 11/065364
DATED : July 6, 2010
INVENTOR(S) : M. Kuwahara et al.

It is certified that error appears in the above-identified patent and that said Letters Patent is hereby corrected as shown below:

Under Item 73: please delete "Hitachi Communication Technologies, Ltd. (JP)".

Signed and Sealed this
Sixth Day of December, 2011

David J. Kappos
*Director of the United States Patent and Trademark Office*